United States Patent [19]

Durvasula et al.

[11] Patent Number: 5,047,620
[45] Date of Patent: Sep. 10, 1991

[54] LASER PULSE RECEIVER FOR DETECTING AND RECORDING WEAK LASER PULSES IN VARIABLE BACKGROUND RADIATION

[75] Inventors: L. N. Durvasula, Vienna; William K. Krug, Herndon; Gary P. Stevenson, Sterling, all of Va.

[73] Assignee: The United States of America as represented by the Secretary of the Army, Washington, D.C.

[21] Appl. No.: 457,124

[22] Filed: Dec. 26, 1989

[51] Int. Cl.⁵ .................................. H01J 40/14
[52] U.S. Cl. ........................... 250/208.2; 250/226
[58] Field of Search ............... 250/226, 208.2, 214 R; 356/416, 419

[56] References Cited

U.S. PATENT DOCUMENTS

| | | | |
|---|---|---|---|
| 4,334,782 | 6/1982 | Thornton, Jr. et al. | 356/419 |
| 4,653,925 | 3/1987 | Thornton, Jr. | 356/419 |
| 4,677,289 | 6/1987 | Nozaki et al. | 250/226 |
| 4,834,541 | 5/1989 | Yamaba | 356/419 |

Primary Examiner—David C. Nelms
Attorney, Agent, or Firm—Milton W. Lee; Anthony T. Lane

[57] ABSTRACT

A radiation detection system for use in the visible and near infrared region which is capable of detecting and recording extremely weak laser pulses in the few nanoseconds range. The system receiver can be directed towards strong radiation sources, such as the sun, without changing the receiver or recording unwanted information. The detection system discriminates between various selected laser sources wavelengths and is comprised of optics, detector, electronic hardware, microcomputer, and signature analysis algorithm.

9 Claims, 7 Drawing Sheets

| SUN SENSOR AC+ AC- DC | | | OPTICAL CHANNELS | | | | | INPUT | OUTPUT | SECTION |
|---|---|---|---|---|---|---|---|---|---|---|
| B7 | B6 | B5 | B4 | B3 | B2 | B1 | B0 | | | |
| 0 | 0 | 0 | 0 | 0 | 0 | 0 | 0 | NO SIGNAL * | NONE | |
| 0 | 0 | 0 | 0 | 0 | 0 | 0 | 1 | RUBY | VALID | |
| 0 | 0 | 0 | 0 | 0 | 0 | 1 | 0 | YAG | VALID | |
| 0 | 0 | 0 | 0 | 0 | 1 | 0 | 0 | 2YAG | VALID | A |
| 0 | 0 | 0 | 0 | 1 | 0 | 0 | 0 | ERBIUM | VALID | |
| 0 | 0 | 0 | 1 | 0 | 0 | 0 | 0 | GLASS | VALID | |
| 0 | 0 | 0 | 0 | 0 | 1 | 1 | 0 | YAG/2YAG | VALID | |
| 1 | X | X | X | X | X | X | X | SUN | INVALID | |
| X | 1 | X | X | X | X | X | X | SUN | INVALID | B |
| X | X | 1 | X | X | X | X | X | SUN | INVALID | |
| X | X | X | X | X | X | 1 | 1 | BROADBAND | INVALID | |
| X | X | X | X | X | 1 | X | 1 | BROADBAND | INVALID | |
| X | X | X | X | 1 | X | X | 1 | BROADBAND | INVALID | |
| X | X | X | 1 | X | X | X | 1 | BROADBAND | INVALID | |
| X | X | X | X | 1 | X | 1 | X | BROADBAND | INVALID | C |
| X | X | X | 1 | X | X | 1 | X | BROADBAND | INVALID | |
| X | X | X | X | 1 | 1 | X | X | BROADBAND | INVALID | |
| X | X | X | 1 | X | 1 | X | X | BROADBAND | INVALID | |
| X | X | X | 1 | 1 | X | X | X | BROADBAND | INVALID | |

NOTE: X = DON'T CARE = 1 OR 0

* ACTIVE COLLECTION MODE

EVENT DECIMAL CODE

0 = NO SIGNAL
1 = RUBY
2 = YAG
3 = INVALID BROADBAND
4 = 2YAG
5 = INVALID BROADBAND
6 = YAG/2YAG
7 = INVALID BROADBAND
8 = ERBIUM
9-15 = INVALID BROADBAND
16 = GLASS
17-31 = INVALID-BROADBAND
32-255 = INVALID-SUNLIGHT

FIG. 5

LASER PULSE RECEIVER FOR DETECTING AND RECORDING WEAK LASER PULSES IN VARIABLE BACKGROUND RADIATION

The invention described herein may be manufactured, used, and licensed by the U.S. Government for governmental purposes without the payment of any royalties thereon.

BACKGROUND OF INVENTION

Many sensors used to detect optical radiation are extremely sensitive. Some are capable of detecting less than one microwatt of power. These detectors perform very well when they are used to detect weak sources in a low background scene. However, in a high background scene, such as bright sunlight, the detector responds to the background light making detection of a relatively weak laser pulse impossible. Commercially available detectors do not have a way to prevent the preamplifier from saturating during periods of high input radiation, resulting in degrading performance or shutting off.

Another limitation of prior art sensors systems is a changing noise level. Currently available detectors/preamplifiers have the characteristic of changing noise level as background changes, resulting in reduced sensitivity of the system. No systems currently available use signal sensing or signature analysis to provide discrimination of unwanted signals.

The above problems in existing sensor systems indicate that they cannot be used in areas of high background. The problems listed above are overcome by the present invention.

SUMMARY OF THE INVENTION

The present highly sensitive detector/preamplifier system uses the following elements and functions to provide automatic overload protection and signature recognition: automatic gain control (AGC) customized to eliminate changes in noise levels due to varying background in the specific application; overcurrent limiting to protect the detector; feedback from the detector bias line to provide a means of discrimination of high input signals; and a signature recognition and analyses algorithm to recognize invalid signals. These concepts used with a laser receiver provide a system which can be used in all types of background without manual adjustment and without recording invalid signals in memory.

The invention will be better understood in view of the following detailed description with references to the drawings.

BRIEF DESCRIPTION OF THE DRAWINGS

FIG. 5 illustrates a truth table of the laser receiver system software;

DETAILED DESCRIPTION OF THE EMBODIMENTS

Briefly, the present laser receive system, or radiation detection system, has the capability of analyzing incoming data and automatically determining if the incoming data represents a valid laser signal or an extraneous source of radiation. The system provides for protection against radiation overload by inhibiting data collection when the system is directed toward a high radiation source, such as the sun, auto headlights, photoflashes, etc. The radiation source will be discussed herein however with reference to the sun. The system is capable of isolating the wavelengths of commonly used lasers, such as ruby, YAG, 2YAG (double YAG), erbium, glass, or the combination of YAG/2YAG. The system also is capable of recording the very weak Q-switched laser pulses from these lasers in the few nanoseconds range in the visible and near infrared range while maintaining the ability to reject the spurious or incoherent high radiation signals.

One object of this system is to prevent damage to the detectors and prevent invalid signals from being recorded in the memory of a microcomputer. The detectors are protected from damage caused by high currents present during periods of high radiation, yet the system will function normally during these periods. The receiver system will not record any information while the receiver is pointed directly at or passing through a high optical radiation source. The latter is an outstanding achievement since the receiver is designed to respond to and record optical radiation signals.

Figure 1:
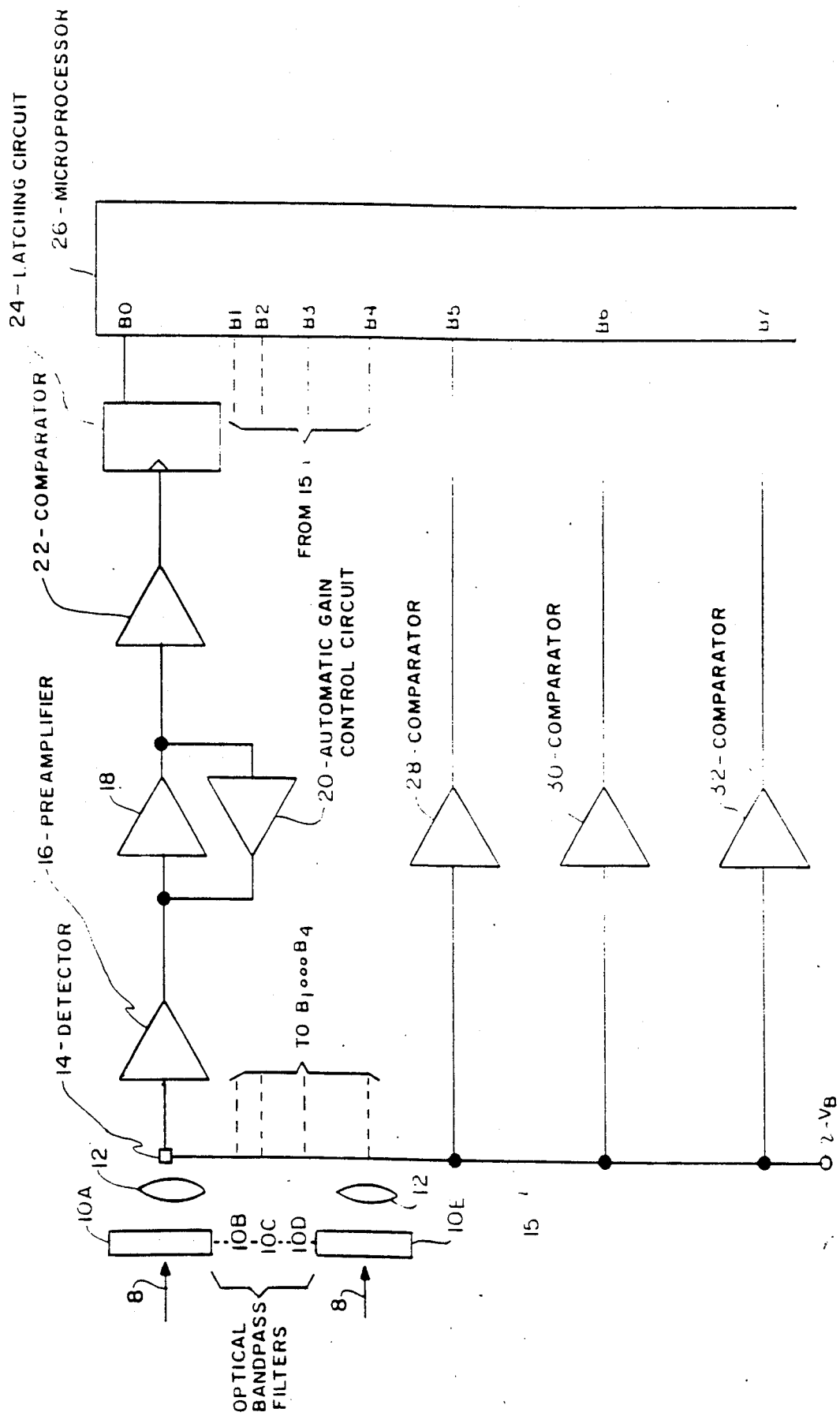
FIG. 1 is a schematic block diagram showing the system and related components.

Refer now to the schematic block diagram of FIG. 1 representing the laser receiver system architecture and related components. Radiation from a plurality of laser sources, such as the five lasers mentioned above, may be represented by 8. Radiation 8 passes through five optical bandpass filters, represented by 10A through 10E. It should be noted that only one of five electrical signal paths, representing detectors current caused by reception of radiat by the detector from five different laser sources, is shown with four more indicated inphant. The system is not limited to five electrical signal paths, but this number is used for illustrative purposes to explain the invention. Each of the bandpass filters passes only the wavelength signal for one of the chosen five laser sources and blocks the wavelengths of the other four. The isolated laser signals are passed through optics 12, which optics may be an objective lens, onto detector 14. A detector bias line, represented by numeral 15, is established between a bias voltage VB and detector 14. Thus, the outputs of the five electrical signal paths each of which represent five distinct and isolated laser frequencies, enter a microprocessor 26 as bits $B_0$, $B_2$, $B_3$, and $B_4$ and 8-bit data words which will be more fully explained herein below but may be a multibit data word not limited 8-bits.

Figure 2:
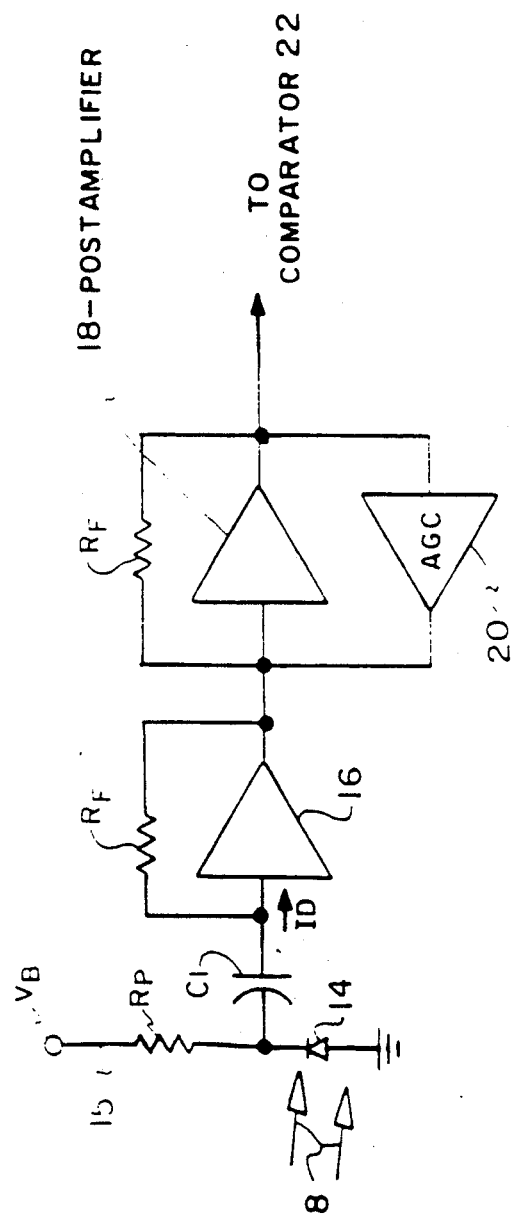
FIG. 2 illustrates the detector/preamplifier with overcurrent protection components.

Refer to FIG. 2 along with FIG. 1 for an explanation of one of the electrical signal paths with it understood that the other paths function the same for the other laser signals processed therethrough. FIG. 2 more specifically illustrates the detector 14 and preamplifier 16 with overcurrent protection components and the post amplifier 18 and an automatic gain control circuit 20 connected thereacross. An incoming signal represented by 8 activates detector 14. The overcurrent protection of D1 is achieved by placing a resistor RP in series with 14 between the bias voltage VB and ground potential. The VB, RP, and 14 to ground potential define the detector bias line 15. The bias voltage VB is usually very high, say about 180 volts d.c. The reistance of RP is chosen to be well below the maximum current rating for the detector 14. The current ID flowing from the detector output into the input of preamplifier 16 as a varying electrical current according to the total radiation impinging on 14 is usually low until the sun hits 14 and then approaches the maximum. preamplifier 16. Does a current to voltage conversion and amplification. The output noise of 16 varies with background conditions and is usually higher in daytime versus nighttime or goes up sharply when 14 is facing the sun. A post amplifier 18 further amplifies the incoming signal 8. Amplifier 18 has an automatic gain control circuit 20 connected thereto to operate on the variable amplitude input signal thereto from 16 to maintain the output from 18 to the input of the comparator 22 constant until a short laser pulse arrives at the input to 16 from detector 14. That is, circuit 20 eliminates changes in noise levels due to changing background signals, such as the sweep of the detector past sunlight. Comparator 22 remains stable, i.e. nonconductive, until the short laser pulse arrives from postamplifier 18. A reference voltage in comparator 22 is set above the normal white noise from 18 when the laser pulse is not present. The latching circuit 24 is latched by the laser pulse from 22 triggering a pulse clock in 24 causing the latching circuit to go to logic 1, i.e. set, to insure that an incoming pulse is recognized by the microprocessor 26 as it goes through cycles of data word collections, storage, signature recognition, and resetting of these latches as elaborated on herein below. Circuit 24 is preferably latched by "D" flip-flops.

Figure 3:
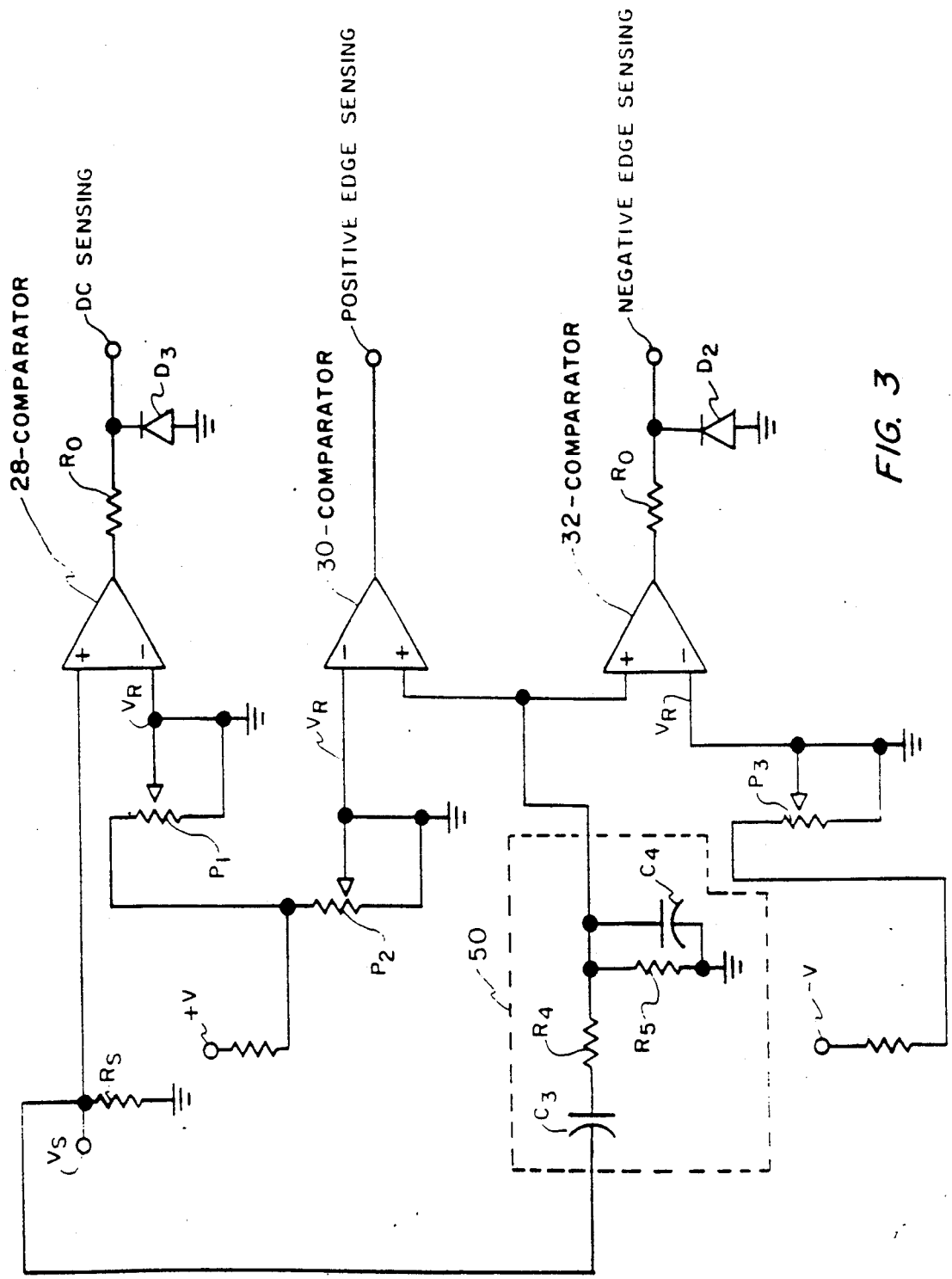
FIG. 3 illustrates the automatic radiation overload sensing circuitry of the system.

Refer now to FIG. 3 for an explanation of the automatic radiation overload sensing circuitry, i.e. the three high radiation sensors, which provide 3 inhibit bits to the multibit data word, herein illustrated as an 8-bit byte, or 8-bit data word. While each of the five electrical signal paths provide five distinct laser source pulses as five distinct bits of the 8-bit data word, the three bit inputs to microprocessor 26 are control signals produced on inhibit signal electrical lines at the outputs of comparators 28, 30 and 32. These three inhibit bits are dedicated to assuring the proper identification of the valid laser signals or rejection of invalid signals.

A sensing resistor Rs is placed in series with the detector bias line. A sensing voltage Vs developed across the resistor Rs gives a measure of the current flowing through the detector. Voltage Vs is applied to the positive inputs of comparators 28, 30 and 32. An adjustable reference voltage Vr is developed at the negative input terminals of comparators 28, 30, 32 by a voltage source +V and potentiometers P1 and P2 respectively, for comparators 28 and 30 and voltage source −V and potentiometer P3 for comparator 32.

The system is calibrated by pointing the detector at the sun. A high current is produced through Rs resulting in a rise in voltage produced at the plus input to all of the comparators 28, 30, and 32. At this point the separate reference voltages Vr are adjusted by P1, P2, and P3 to provide an output from comparators 28, 30, and 32 when the detector current is above a certain desired level. The output from 28 provides a direct current (DC) sensing input to microprocessor 26 as a bit B5 of a multibit data word. Since the output from 28 may have positive and negative swings of voltage of about ±5 volts a current limiting resistor Ro is placed in series and diode D3 is connected to ground to limit the negative voltage input to 26 to 0.7 volts.

A filter circuit 50 between Vs and the positive inputs to 30 and 32 provide respective control signals generated by either small but rapid increases or decreases in the detector bias current level through Rs. Filter circuit 50 is comprised of capacitor C3 and resistor R4 in series with Rs and capacitor C4 and resistor R5 in parallel between ground potential and the terminal between R4 and the positive input terminals of 30 and 32. Filter circuit 50 is designed to filter out rapid current changes and pass only slow current changes. This is necessary to prohibit high repetition rate laser, i.e. lasers having a repetition rate above the above noted lasers of interest from triggering the high radiation sensors, i.e. the positive edge sensing of 30 and the negative edge sensing of 32. Changes in the detector bias current below the cut-off frequency develop a current through C3 and corresponding voltage across R5, called Vr5. If Vr5 exceeds the reference voltage Vr comparator 30 responds to increases in the detector bias current, when the detector is moved from facing a low to a high background, and a positive edge sensing pulse is applied to 26 as bit B6. The R5 and C4 paralled circuit by-pass the rapid current changes. Comparator 32 responds to decreases in the detector bias current, when the detector is moved from facing a high to a low background, and a negative edge sensing pulse is applied to 26 as bit B7. Resistor Ro and diode D2 to ground at the output of 32 serve the same function as Ro and D3 did to 28, i.e. to respectively limit current and limit the negative voltage input to 26.

Figure 4:
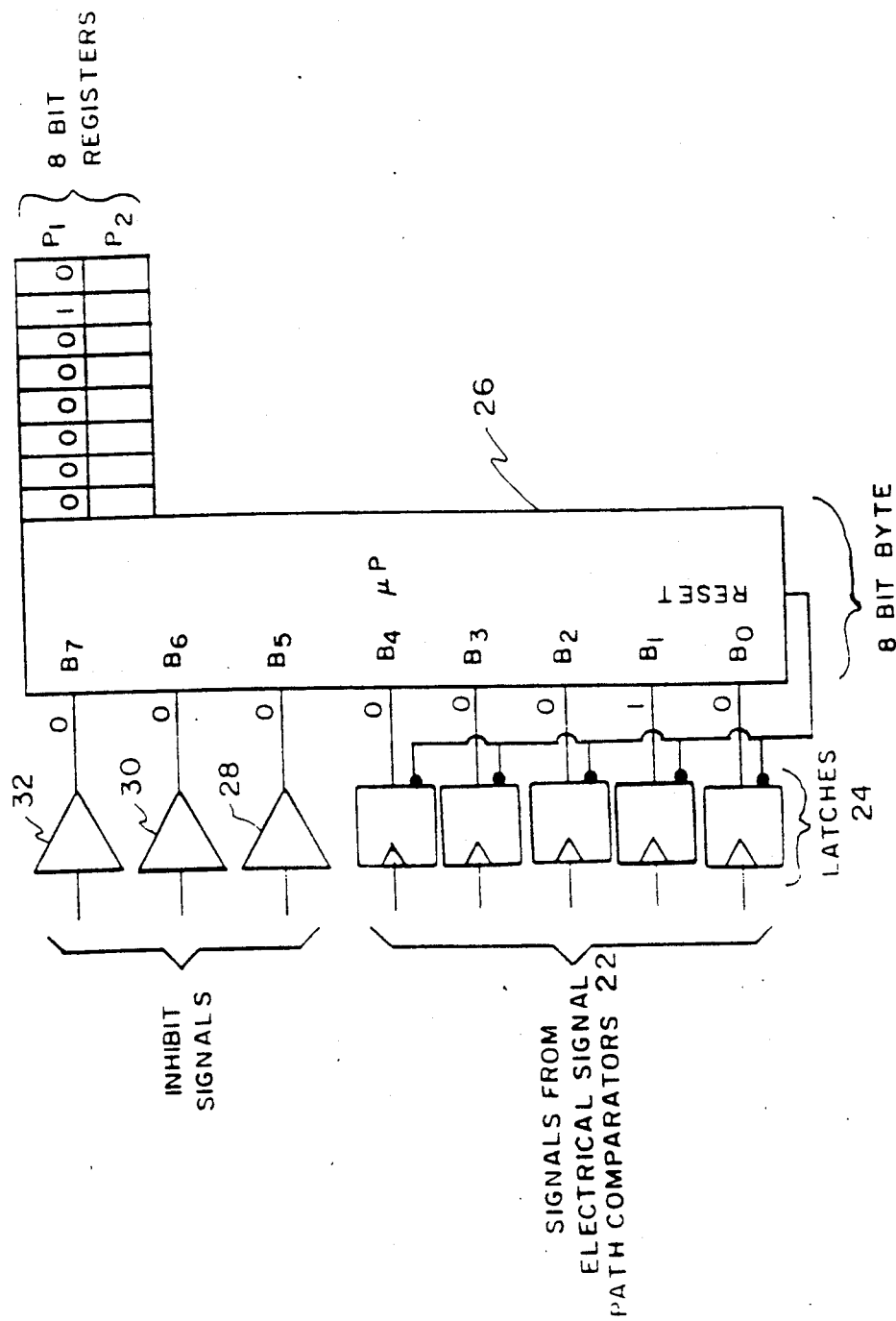
FIG. 4 is a schematic illustration of the system hardware relating to data collection.
Figure 6:
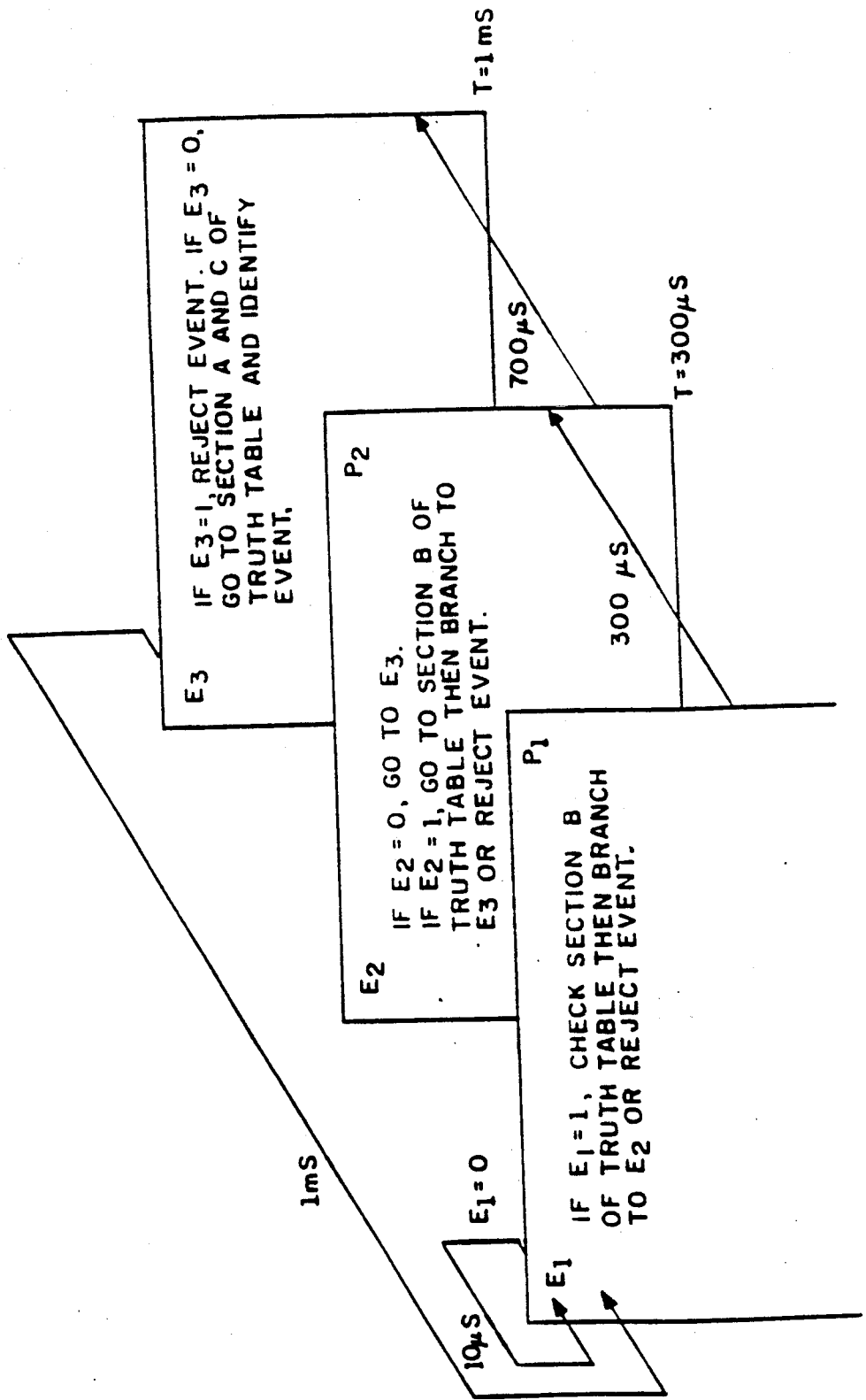
FIG. 6 illustrates data validation by length of laser pulse method of identification.

Refer to FIGS. 4, 5 and 6 for an example of one laser pulse being detected and identified as a positive bit B1, indicated as 1. All of the other bits are negative or zero, indicated as 0. Referring to the truth table of the laser receiver system of FIG. 5 indicates that the event decimal code of a positive bit B1 is that of a YAG laser. Refer now also to FIG. 6 which indicates that when a first reading of the data word represents a positive event, i.e. E1=1, the positive bit B1 will be stored in a first 8-bit register, as shown in FIG. 4 and indicated in FIG. 6. It should be noted that FIG. 6 illustrates data validation by the length of laser pulse method of identification and will be explained herein below with reference to FIG. 7, which shows the flow chart of the data validation algorithm using the length of laser pulse method. The illustration of FIG. 4 is a snapshot of the microprocessor 26 operation immediately after the data word is stored in P1. Immediately following the storage in P1 26 will reset all five of the latches 24 back to negative or zero. That is, all latches 24 will be cleared after a pulse is recognized to await for a second reading E2 of the data word 300 usec after E1. The reason the microprocessor 26 is programmed to wait 300 usec for E2 is that 300 usec is the upper limit pulse lenght for any laser pulse of interest.

Refer to FIG. 5 for a more detailed explanation of the truth table operation in the laser receiver system operation. The truth table uses the "don't cares", i.e. symbol X, for legibility. Since the 8-bit data word represents 255 possible data words, it is conceivable that any of these combinations can be produced. Thus, the truth table is needed in considering the software for use in this laser receiver system.

The truth table shows in graphic form the different binary combinations, what source is associated with the input signal to the detector, and what the output of the system is in response to each input. The first line of the table is no signal situation where the binary 0 is read as a data word. In this instance, the system takes no action and continually reads the data word. This will continue until the unit is turned off or the system receives a binary 1 signal. This is represented by the E1=0, which keeps recycling every 10 usec, as shown in FIG. 6. The next lines, or section B, show the various data words formed when the above mentioned lasers of different wavelengths are detected. These data words form the binary numbers 1, 2, 4, 8 and 16 for the respective wavelengths. Another possible situation is taken into account. This is the detection of simultaneous pulses on the YAG and double YAG optical signal channels. This situation may result from pulses detected from an improperly tuned green laser which is putting out both wavelengths. The laser receiver system will detect and record this case.

The next section of the truth table, i.e. section B, with data words formed when binary 1 signal are received from the three inhibit signal lines, shown as the sun sensor column. In logic terms, if either of bit 7, bit 6, or bit 5 are equal to binary 1, then the rest of the 8-bit data word becomes a don't care. This is because in real terms something other than a valid laser has triggered the system and any data present at this time is invalid and the output is invalid.

Section C of the truth table addresses all combinations of broadband sources that do not trigger any of the inhibit signals under the sun sensor column. The broadband source condition may arise due to the extremely fast response time of the detectors. Through experimentation it is found that if the system is passed through the sun during the transient period from low to high background the microprocessor 26 receives random pulses for just the instant that one or more of the detectors has the sun in its field of view. As the sun or another broadband source comes fully into the field of view of the detector, all channels respond and the microprocessor 26 receives multiple signals from the optical signal or inhibit channels. If a signal is recorded on more than one of these channels, except for the case of the YAG and double YAG, the microprocessor 26 will reject this signal as a broadband source.

An event decimal code is shown below the truth table which shows the decimal equivalent of the binary data words. This shows in tabular form the response of the system to every possible data word combination, i.e. the full 255 as noted above.

Figure 7:
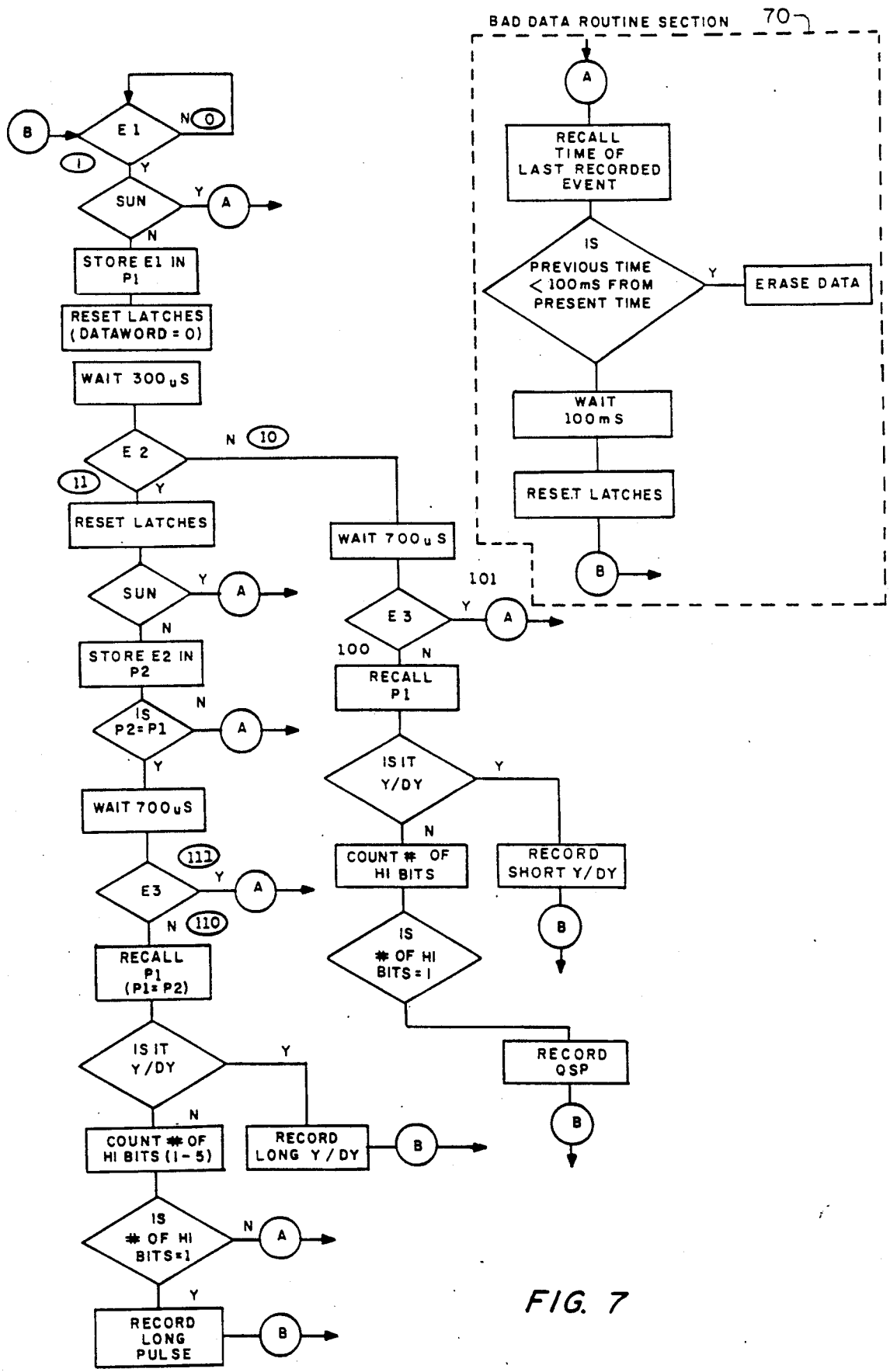
FIG. 7 illustrates a functional flow chart of a data validation algorithm.

The next level of data validation for the system uses the length of the laser pulse as a method of identification. A summary of this method is shown in graphic form in FIG. 6. The flow chart of data validation algorithm is shown in FIG. 7. A length of pulse truth table is also shown..The method involves three separate readings of the binary data word. The first reading, indicated by E1, represents the first detection of an event. E1 is stored in the P1 8-bit register. The latches 24 are reset. After 300 usec, the microprocessor 26 reads the data word the second time, indicated by E2. If there is still a binary 1 present, i.e. E2=1 26 resets the latches and a determination is made as to if the input binary 1 is the sun. If not, E2 is stored in the P2 8-bit register. If it is the sun, the data word will be applied to a bad data routine 70 of the microprocessor since the data word is invalid. Looking at the data validation algorithm flow chart shows that the circle A's are the branch offs from the main routine to 70 since all of these instances are invalid data. The bad data routine recalls the last recorded event and eventually resets the latches 24 and ends the program. The ending of the program and the start of the next cycle is indicated by the circle B's. These circle B's also record the type laser that has been identified by the detections E1, E2 and E3 of the events.

Now go back to the second reading of the data word wherein E2=0, represented by the encircled 10 in FIG. 7. In this instance where E2=0, the detected signal is either a Q-switched pulse or an invalid signal. After a wait of 700 usec a third reading E3 indicates whether a binary 1 is present. If so, the data is invalid and is shown as a 101 and is passed to section 70. If there is no binary 1, i.e. the reading is 100 and the 8-bit data word stored in P1 is recalled and is determined to be either a short YAG/double YAG detection or is a Q-switched pulse and are recorded as same.

The third reading E3 is also made on the E1=1 and E2=1 readings after waiting 700 usec from the E2 reading. If E3=1, then the reading is 111 is passed to 70. If E3=0, P1 is recalled and is determined to either be a long YAG/double YAG detection or is an otherwise valid long pulse.

The constraints of the present version of the software may be altered, or other lasers having different wavelength characteristics determined by the laser receiver system, with the principles of operation remaining within the scope of this application.

We claim:

1. A laser pulse receiver system for detecting and recording very weak laser pulses in the presence of variable background radiation, said system comprised of:

a plurality of optical bandpass filters wherein each of said plurality of optical bandpass filters passes only one wavelength of signal pulses of one each of a plurality of selected valid laser sources and blocks all other wavelengths of said selected valid laser sources;

an optics and a detector, said detector positioned on a detector bias line wherein said optics focuses incoming radiation from said plurality of optical bandpass filters including said variable background radiation onto said detector wherein said detector produces an output varying electrical current in response to said incoming radiation;

a microprocessor;

a plurality of electrical signal paths and inhibit signal electrical lines for receiving said detector output varying electrical current, wherein each of said plurality of electrical signal paths isolates and passes only one of said selected valid laser source wavelength signal pulses included in said detector output varying electrical current therethrough and wherein said plurality of inhibit signal electrical lines identifies invalid variable background radiation source, wherein separate outputs from each of said plurality of electrical signal paths, and said inhibit signal electrical lines constitute a multibit data word which is passed to said microprocessor for selectively storing and retrieving by said microprocessor to determine the presence of specific valid laser pulses.

2. A system as set forth in claim 1 wherein said plurality of electrical signal paths is five and said plurality of inhibit signal electrical lines is three forming an 8-bit data word input to said microprocessor.

3. A system as set forth in claim 2 wherein each of said five electrical signal paths have separate optical bandpass filters which pass only the wavelength of one laser source for each of said five electrical signal paths representing five distinct and isolated laser frequencies.

4. A system as set forth in claim 3 wherein each of said five electrical signal paths is comprised of overcurrent protection means when said detector is facing a high radiation source, preamplifier for converting the variable detector current to a variable amplitude voltage and amplifying said voltage, a post amplifier receiving at an input thereto said variable amplitude voltage from the output of said preamplifier in which said variable amplitude voltage is further amplified at the output wherein said postamplifier has an automatic gain control circuit connected from said output back to said input to operate on the variable amplitude voltage at the input to said postamplifier to maintain a constant output voltage at the output of said postamplifier prior to receiving an electrical signal on said electrical signal path which represents valid laser source pulses, and a comparator at the output of said postamplifier which passes only valid laser pluses to a latching circuit connected to said microprocessor.

5. A system as set forth in claim 4 wherein said three inhibit signal electrical lines provide control signals to said microprocessor when the detector faces a high radiation source wherein a first of said inhibit signal electrical lines provides a direct current sensing binary 1 signal to said microprocessor when a comparator responds to a sensing voltage, a second of said inhibit signal electrical lines produces a positive edge sensing binary 1 signal to the microprocessor when a comparator responds to increases in the detector bias current caused by the detector moving from low to high background, and a third of said inhibit signal electrical lines produces a negative edge sensing binary 1 signal to said microprocessor when a comparator responds to decreases in the detector bias current caused by the detector moving from high to low background wherein said three inhibit signal electrical lines comprise automatic radiation overload sensing circuitry.

6. A system as set forth in claim 5 wherein said 8-bit data word which is selectively stored and retrieved by said microprocessor is comprised of a common line reset from said microprocessor to all five of said latching circuits wherein only a valid laser pulse from said comparator triggers a clock pulse in said latching circuit to cause said latching circuit to be set at a binary 1 to insure that said valid laser pulse is recognized by said microprocessor.

7. A system as set forth in claim 6 wherein said microprocessor is programmed by a signature recognition algorithm to identify and record laser signals by isolating and recording valid laser signals while rejecting extraneous high radiation sources by using the principle that said valid laser signal will appear on only one of said electrical signal paths as a binary 1 at said latching circuit wherein all of the other seven bits of said 8-bit data word are binary 0 and that presence of a binary 1 at more than one latching circuit indicates an invalid output, wherein said algorithm further takes separate readings of said 8-bit data words at short intervals to determine if a binary 1 is present on one of said latching circuits wherein the presence of one binary 1 on a latching circuit at a first reading causes said microprocessor to store said 8-bit data word in a first 8-bit register and reset said five latch circuits and take a second reading of said 8-bit data word at an interval matching the longest anticipated laser pulse to determine if conditions of said 8-bit data word is the same or different at both first and second readings to positively identify the laser source viewed by said system or reject as an extraneous high radiation source or broadband input signal wherein a third reading is made about 1 millisecond from said first reading when said laser source is identified by said second reading to determine if laser source is putting out frequencies of both YAG and double YAG or is a Q-switched laser pulse.

8. A system as set forth in claim 7 wherein the interval between said first reading and said second reading is 300 useconds.

9. A laser pulse receiver system for detecting and recording very weak laser pulses and discriminating the laser pulses from radiation from extraneous high radiation sources under varying background noise conditions; said system comprised of:
 a plurality of optical bandpass filters wherein each of said plurality of optical bandpass filters passes only one wavelength of signal pulses of one each of a plurality of selected valid laser sources and blocks all other wavelengths of said selected laser sources;
 an optics and a detector wherein said optics focuses incoming radiation passing through from said plurality of optical bandpass filters including radiation from said extraneous high radiation sources onto said detector and detector produces a varying electrical current signal at its output according to the incoming radiation pattern thereon;
 a microprocessor;
 a laser signature recognition means comprised of a plurality of electrical signal paths positioned between said detector and said microprocessor for producing a plurality of bits to a multibit data word of said microprocessor with each of said plurality of electrical signal paths sensing only radiation at the wavelength of a selected laser source, each of said plurality of electrical signal paths comprised of a detector overcurrent protection means, a preamplifier having an input connected to receive the detector current fluctuations as an input thereto for converting said detector output varying electrical current to a varying amplitude voltage and amplifying said voltage, a postamplifier which further amplifies said variable amplitude voltage and an automatic gain control circuit connected from an output of said postamplifier back to an input of said postamplifier wherein said automatic gain control circuit operates on said variable amplitude voltage at the postamplifier input to maintain a constant postamplifier output voltage prior to receiving valid laser source pulses on said electrical signal path, a comparator having an input connected to the postamplifier output wherein said comparator has a reference voltage therein which causes said comparator to be stable until a short valid laser pulse arrives at said input from said postamplifier output, and a latching circuit means connected between an output from said comparator and an input to said microprocessor wherein said valid laser pulse at said comparator input causes said comparator to become conductive and trigger a pulse clock in said latching circuit means causing said latching circuit means to set to insure that said microprocesses recognizes said specific valid laser pulse;

an automatic radiation overload sensing circuit comprised of three inhibit signal electrical lines between a detector bias line and said microprocessor wherein said three inhibit signal electrical lines provide control signals to 3 bits of said multibit data word, first of said inhibit signal electrical lines provides sensing of the detector direct current, second of said inhibit signal electrical lines provides a control signal to said microprocessor generated by small but rapid increases in the detector current level when the detector is moved from low to high background level of radiation, and third of said inhibit signal electrical lines provides a control signal to said microprocessor generated by small but rapid decreases in the detector current level when the detector is moved form a high to a low background level of radiation; and a signature recognition means of identifying and recording valid laser signals in said plurality of electrical signal paths by separating valid signals from invalid signals wherein invalid signals are comprised of a control signal from one of said three inhibit signal electrical lines or improper combination of broadband laser signals caused by extremely fast response time of the detector when the detector is passed through a high radiation source in which none of said three inhibit signal electrical lines provide a control signal to said microprocessor.

* * * * *